United States Patent

Peurrung et al.

[11] Patent Number: 6,134,289
[45] Date of Patent: Oct. 17, 2000

[54] THERMAL NEUTRON DETECTION SYSTEM

[75] Inventors: Anthony J. Peurrung, Richland; David C. Stromswold, West Richland, both of Wash.

[73] Assignee: Battelle Memorial Institute, Richland, Wash.

[21] Appl. No.: 09/071,647

[22] Filed: May 1, 1998

[51] Int. Cl.$^7$ ...................................................... G01T 3/00
[52] U.S. Cl. .......................... 376/153; 376/251; 376/254; 250/390.1; 250/390.01; 250/393
[58] Field of Search .................................. 376/153, 251, 376/254, 463; 250/390.1, 393

[56] References Cited

U.S. PATENT DOCUMENTS

| | | | |
|---|---|---|---|
| 3,778,627 | 12/1973 | Carpenter | 250/499 |
| 3,786,256 | 1/1974 | Untermyer | 250/71.5 R |
| 3,794,843 | 2/1974 | Chen | 250/359 |
| 5,334,840 | 8/1994 | Newacheck et al. | 250/483.1 |
| 5,399,863 | 3/1995 | Carron et al. | 250/370.05 |
| 5,734,689 | 3/1998 | Copeland et al. | 376/153 |
| 5,811,818 | 9/1998 | Bach et al. | 250/390.01 |

FOREIGN PATENT DOCUMENTS 09197055  7/1997  Japan ..................................... 376/153

OTHER PUBLICATIONS

Peurrung et al., Location of Neutron Sources Using Moderator–Free Directional Thermal Neutron Detectors, *IEEE Transactions On Nuclear Science,* vol. 44, No. 3, Jun. 1997.
Vanier et al., A Thermal Neutron Source Imager Using Coded Apertures, 36$^{th}$ Meeting on Proceedings of INMM, vol. XXIV, Jul., 1995.
Vanier et al., Advances In Imaging With Thermal Neutrons, , 37$^{th}$ Meeting on Proceedings of INMM, vol. XXV, Jul.–Aug., 1996.

*Primary Examiner*—Charles T. Jordan
*Assistant Examiner*—Jack Keith
*Attorney, Agent, or Firm*—Paul W. Zimmerman

[57] ABSTRACT

According to the present invention, a system for measuring a thermal neutron emission from a neutron source, has a reflector/moderator proximate the neutron source that reflects and moderates neutrons from the neutron source. The reflector/moderator further directs thermal neutrons toward an unmoderated thermal neutron detector.

5 Claims, 1 Drawing Sheet

THERMAL NEUTRON DETECTION SYSTEM

This invention was made with Government support under Contract DE-AC06-76RLO 1830 awarded by the U.S. Department of Energy. The Government has certain rights in the invention.

FIELD OF THE INVENTION

The present invention is related to an apparatus and method for measuring neutron emission from a neutron source. The apparatus and method are useful for assay of transuranic material. More specifically, the invention is related to characterizing transuranic material that produces a high gamma ray background. As used herein, the term transuranic material is defined as radionuclide(s), radionuclide compound(s) (e.g. oxide(s) and/or fluoride(s)) and combinations thereof.

BACKGROUND OF THE INVENTION

Measurement of neutrons has been of interest since the development of nuclear power. Assay of remote handled radioactive waste for transuranic content is becoming more important as the cleanup of radioactive waste progresses. Remote handled radioactive waste is defined as radioactive waste having more than 100 nCi/g of radioisotopes heavier than $^{238}$U and with half lives greater than 20 years. Assay for transuranic content can be made by detecting neutrons and inferring transuranic (plutonium) content. Present equipment for measuring neutrons using He$^3$ proportional counters ceases to accurately function at gamma-ray exposure rates of about 4 R/hr and above. High gamma-ray exposure rates are often present from transuranic waste because of the presence of fission products. By sacrificing sensitivity, measurements may be obtained with exposures from 10–50 R/hr with existing systems. Because remote handled waste has a minimum threshold of a contact exposure rate of 200 mR/hr and can be as high as 10,000 R/hr, existing instruments are useful only for the lowest exposure wastes.

Hence, there is a need for a neutron detector that can measure neutrons from a waste source having the maximum contact exposure.

SUMMARY OF THE INVENTION

According to the present invention, a system for measuring a thermal neutron emission from a neutron source has a reflector/moderator proximate the neutron source that reflects and moderates (slows down) neutrons from the neutron source. The reflector/moderator further directs thermal neutrons toward an unmoderated thermal neutron detector. By moderating (slowing down) the high-energy neutrons emitted from the waste to thermal energy neutrons and reflecting (directing) them toward a detector, more neutrons are made available for detection by the thermal-neutron detector.

An unmoderated thermal neutron detector is located at a distance from the radioactive source in the direction along which the reflector/moderator directs the neutrons. (An unmoderated thermal neutron detector does not have moderating material, such as polyethylene, proximate the detector. Thus it is sensitive to thermal neutrons but not to high-energy neutrons.) The distance separating the source and the detector allows the gamma-ray background from the source to decrease to lower levels, reducing potential interference with the neutron signal. This allows operation of the thermal neutron detector even when the gamma-ray exposure rate at the source is very high. The reflector/moderator does not significantly direct gamma rays toward the detector, as it does neutrons.

By having the thermal neutron detector shielded from thermal neutrons incident from directions other than the direction from the source, the background counts in the detector are reduced, enabling more sensitive detection of neutrons from the source. Because the detector itself is unmoderated, high-energy neutrons that are part of the background do not slow down near the detector and contribute to the background.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
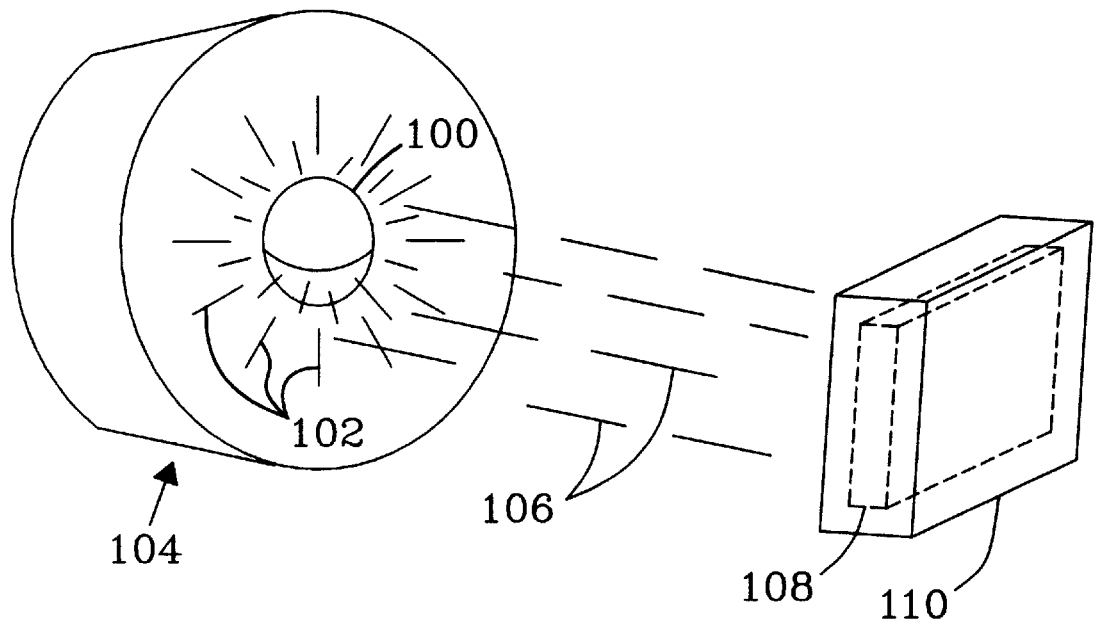
FIG. 1 is an isometric schematic of the present invention.
Figure 2:
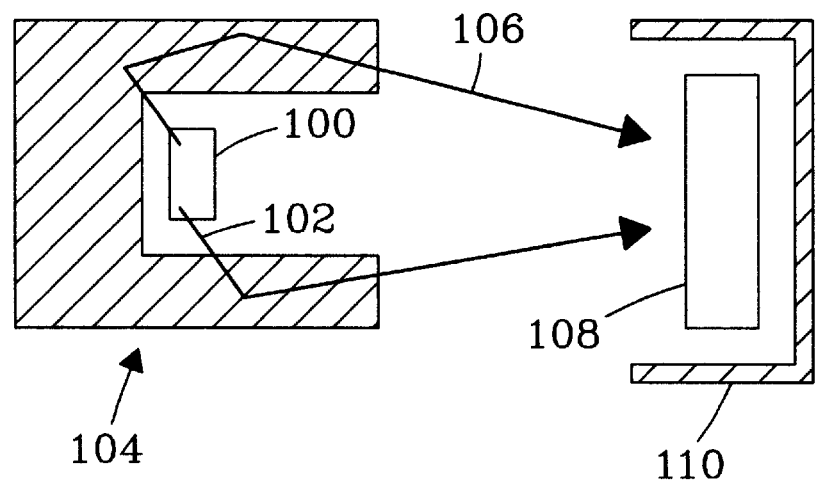
FIG. 2 is a side section of the present invention.

The system of the present invention is shown in FIG. 1. A neutron source 100 emits neutrons 102 therefrom in all directions. A reflector/moderator 104 proximate the neutron source reflects and moderates neutrons from the neutron source 100. The reflector/moderator 104 further directs thermal neutrons 106 toward an unmoderated thermal neutron detector 108.

It is preferred that the reflector/moderator 104 surround the neutron source 100 for at least 15% of the total $4\pi$ steradian solid angle measured from a center of the neutron source 100. It is most preferred that the reflector/moderator 104 surround up to about 85% of the total solid angle, leaving open that portion of solid angle that "sees" the thermal neutron detector 108. The reflector/moderator 104 may be made of any neutron moderating and/or reflecting material. A preferred reflector/moderator is made from graphite, heavy water, polyethylene or combinations thereof. The reflector/moderator 104 may be any shape having rounded or flat surfaces, cusps, corners or other features.

The thermal neutron detector 108 is unmoderated for the purpose of permitting any fast neutrons to pass through it undetected. Fast neutrons moderated within and detected by the thermal neutron detector 108 result in background counts that decrease the precision of an assay of a source 100. The thermal neutron detector 108 further preferably is a directional or collimated thermal neutron detector. Collimation permitting a view of less than 10% of the total solid area defined from a center of the thermal neutron detector 108 reduces detection of background thermal neutrons by about 90%. Thus, in a preferred embodiment, the thermal neutron detector is nearly completely surrounded by a thermal neutron absorbing material 110. The thermal neutron absorbing material is any material that absorbs thermal neutrons including but not limited to boron ($^{10}$B), cadmium, gadolinium and combinations thereof. The thermal neutron absorbing material may be deployed, for example by placing particulates of the thermal neutron material in paint and applying the paint to a surface, for example aluminum sheet. The thermal neutron detector 108 may be any detector capable of detecting thermal neutrons, for example a $^3$He gas filled detector.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for measuring a thermal neutron emission from a neutron source, comprising:

(a) a reflector/moderator proximate the neutron source that reflects and moderates neutrons from the neutron source, the reflector/moderator directs neutrons; toward (b) an unmoderated thermal neutron detector collimated to receive thermal neutrons from less than 10% of a solid angle from a center of the thermal neutron detector.

2. The system as recited in claim 1, wherein said reflector/moderator is selected from the group consisting of graphite, heavy water, polyethylene and combinations thereof.

3. The system as recited in claim 1, wherein said reflector/moderator surrounds at least 15% of a solid angle from a center of the neutron source.

4. The system as recited in claim 1, wherein said unmoderated thermal neutron detector is collimated with a thermal neutron absorbing material partially surrounding the detector.

5. The system as recited in claim 4, wherein said thermal neutron absorbing material is selected from the group of boron, cadmium, gadolinium and combinations thereof.

\* \* \* \* \*